March 17, 1942.     I. GURWICK     2,276,387
PRINTED COATED WRAPPERS
Filed July 3, 1940
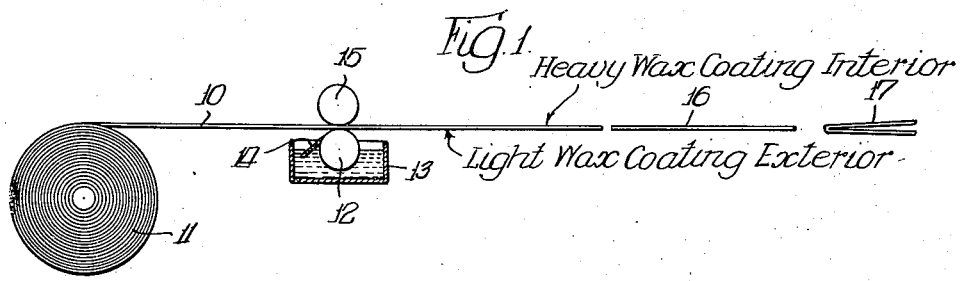
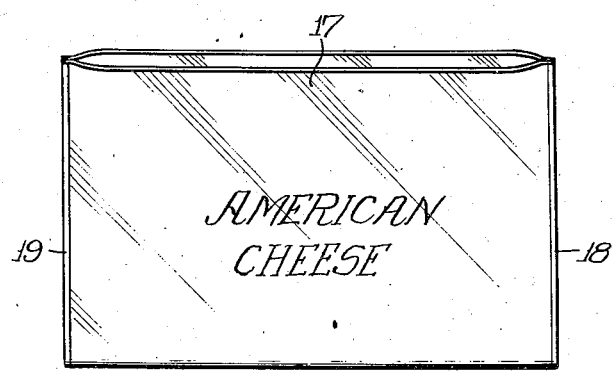
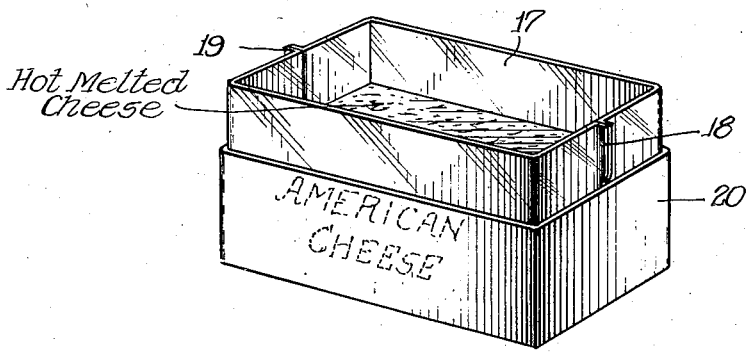
INVENTOR.
Irving Gurwick Patented Mar. 17, 1942

2,276,387

UNITED STATES PATENT OFFICE 2,276,387

PRINTING COATED WRAPPERS

Irving Gurwick, Mount Vernon, Ohio, assignor to Shellmar Products Company, Mount Vernon, Ohio, a corporation of Delaware Application July 3, 1940, Serial No. 343,801

3 Claims. (Cl. 93—3)

The present invention relates to the printing of wrappers composed of a material such as transparent rubber hydrochloride and coated with a wax-like material for the packaging of cheese and similar products.

A principal object of the invention is an improved method for providing a transparent rubber hydrochloride cheese wrapper having a wax-coated exterior surface with decorative material.

A further object of the invention is an improved process for decorating wax-coated transparent rubber hydrochloride, the process involving an initial decoration of a wax-coated surface of the transparent rubber hydrochloride with an intaglio deposited ink composed in part of chlorinated rubber forming the decorated web into a container and thereafter subjecting the material to heat sufficiently high to provide an amalgamation of the heat and wax coating without causing the ink to run or offset or causing the transparent rubber hydrochloride to be objectionably deformed, the heat preferably being applied by pouring a hot melted substance into the interior of the bag.

These and other objects of the invention will be evident upon a consideration of the following specification and by reference to the accompanying drawing, in which Fig. 1 is a diagrammatic view showing the method of applying decorative designs to the web and formation of the web into a container;

Fig. 2 is a view of the decorated side of the resulting container; and

Fig. 3 shows the container filled with a hot melted substance which will cause the ink on the exterior surface of the container to set into non-offsetting condition.

Transparent chlorinated rubber films have been recognized as desirable in packaging many commodities, particularly those requiring protection against loss of moisture. This material is more difficult to print than other transparent films such as regenerated cellulose, due to the tendency of inks deposited on the film to offset. Transparent rubber hydrochloride has been used rather extensively in the packaging of cheese and in producing wrappers for this purpose it is desirable to coat the rubber hydrochloride with a wax-like substance. Customarily, the side of the transparent rubber hydrochloride sheet which is to constitute the interior of the cheese package is provided with a heavy wax coating. The portion of the sheet which is to constitute the exterior of the package bears a light coating of the wax which may not be perceptible upon ordinary observation. This outer coating may be in the nature of an impregnation, but, however slight, it exercises a definite tendency toward making the surface less satisfactory as an ink-retaining surface. The rubber hydrochloride may be coated on one side with a heavy coat of wax and then wound into roll form. This causes a sufficient offset of wax to the uncoated side to make the latter bear a sufficient coating or deposit of wax to reduce its ink-retaining characteristics.

As shown in Fig. 1, a web 10 of a wrapping material of this type is taken from a roll 11 and passed through an intaglio printing unit consisting of an etched printing cylinder 12 which runs in a conventional color bath 13 bearing a chlorinated rubber ink in a suitable solvent. A doctor blade 14 removes the excess ink from the printing cylinder, and the web is maintained in printing contact with the etched cylinder 12 by means of an impression roll 15. It will be understood that the etched cylinder 12 is provided with any desired etched design such as the words "American cheese." Other advertising material also generally will be printed on the web. It will be noted that the ink is deposited on the side of the sheet having the light wax coating and which subsequently constitutes the exterior side of the cheese container.

After the web is printed the container blanks 16 are cut from it. Subsequently these blanks are folded along a central line into overlapped position and the adjacent edges of the blank are joined together by the application of heat. In folded-over condition the blanks 16 take the form of an envelope 17 and when heat-sealed this envelope has opposite ends 18 and 19 thermoplastically joined together into an integral structure.

The printed containers constructed in the manner described should be protected against offsetting, since the ink has a definite tendency toward smearing when coming in contact with other surfaces. The ink employed in the process is one which will wet the film upon which it is deposited. A preferred ink of this type consists of chlorinated rubber dissolved in a solvent such as tuluol or xylol or in a mixture of suitable solvents, together with a pigment. Inks of this type may be deposited by the intaglio method, although other methods of depositing the ink also may be utilized. The wax-bearing printed surface of the web is of an unctuous nature which does not afford a firm basis for the ink and the latter smears quite easily in contact with other surfaces.

In accordance with the present invention the pouch 17 is subjected to a heating operation which has the effect of producing a definite set with respect to the ink so that after the heating it is no longer necessary to protect the printed face of the container from offsetting. In the heating operation the temperature of the process is controlled so that the wax is definitely softened without deleteriously affecting the thermoplastic transparent rubber hydrochloride. A temperature of 180° F. is satisfactory for this purpose. The temperature of melted cheese has been found suitable for effecting the set of the ink, and the process preferably involves positioning the container 17 in an outer rigid container 20 constructed of paper board or the like, and pouring hot, melted cheese into the container until it is sufficiently filled, the outer container imparting the desired form to the transparent rubber hydrochloride. In this process the heat of the cheese itself is transferred through the transparent rubber hydrochloride to the outer wax-bearing surface to produce an amalgamation between the printed matter and the wax which protects the printed matter from offsetting. After the cheese has cooled and solidified the package may be removed from the outer container if desired without danger of the printed material offsetting in contact with other surfaces. The nature of the combination between the lacquer ink and the printed material thereafter is such that the ink has even less tendency for offsetting than in the case of printed plain transparent rubber hydrochloride. Unless heated in this manner the printed matter on the wax-bearing cheese wrapper has considerably greater tendency for offsetting than printed plain transparent rubber hydrochloride. After the cheese has been placed in the container the upwardly extending edges of the container may be folded over and heat-sealed together to complete the formation of the package.

While the wax-bearing printed surface of the transparent rubber hydrochloride may be heated otherwise than by the cheese itself, this latter method is preferred by reason of the uniformity of temperature it provides and because it involves heating under such conditions that the transparent rubber hydrochloride itself does not become deleteriously deformed. Also, during the heating operation the printed portion of the wrapper is maintained slightly under pressure against the outer container without allowing relative movement between the outer container and the wrapper. This is of advantage in effecting the ink-retaining amalgamation between the ink and the wrapper or container.

A suitable ink for use in accordance with the process may be made by mixing 25 per cent iron blue with 21.4 per cent of 20 centapoise chlorinated rubber and 53.6 per cent toluol, and compounding 2.5 gallons of this base with 24.35 ounces of a plasticizer such as dibutyl phthalate, 0.41 gallon of toluol, and 2.5 gallons of a 50 per cent toluol solution of 2.5 viscosity polyumyl acetate. Other ink compositions may be compounded as desired.

It will be recognized that many changes may be made in the procedure described herein for the purpose of explanation, and such changes are intended to be included in the appended claims.

I claim:

1. The method which comprises providing a sheet of transparent rubber hydrochloride with a relatively heavy wax-bearing coating on one side and a relatively light wax-bearing deposit on the other side, applying printed matter on the side of the web bearing the relatively light wax deposit, forming a container blank from the web with the printed surface on the exterior thereof, and subjecting the printed face to the action of a sufficient quantity of heat to produce an amalgamation between the printed matter and the wax-bearing surface.

2. The method which comprises printing a design on a surface of a sheet of transparent rubber hydrochloride having a relatively light wax deposit on one surface and a heavy wax coating on the other surface, folding the sheet into container form with the printed side constituting the exterior thereof, heat-sealing edges of the container, placing the container in a form, and pouring hot melted cheese into the container while the latter is distended against said form, and maintaining the cheese-filled container in the form until the cheese is cooled and the printed design has amalgamated with the wax-bearing surface of the container.

3. The method which comprises depositing an ink containing chlorinated rubber upon the lightly coated side of a sheet of transparent rubber hydrochloride having a light wax deposit on one surface, folding the sheet into container form, heat-sealing the edges of the sheet, and subjecting the container to the action of a sufficient amount of heat to effect amalgamation of the printed design with the wax-bearing surface of the container.

IRVING GURWICK.